US012780688B2

(12) United States Patent
Biris et al.

(10) Patent No.: US 12,780,688 B2
(45) Date of Patent: Nov. 3, 2026

(54) METHOD FOR SYNTHESIZING MAGNETIC, SUPERHYDROPHOBIC AND SUPEROLEOPHILIC MEDIUM

(71) Applicant: BOARD OF TRUSTEES OF THE UNIVERSITY OF ARKANSAS, Little Rock, AR (US)

(72) Inventors: Alexandru S. Biris, Little Rock, AR (US); Ali T. Abdulhussein, Little Rock, AR (US); Ganesh K. Kannarpady, Little Rock, AR (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 607 days.

(21) Appl. No.: 17/959,415

(22) Filed: Oct. 4, 2022

(65) Prior Publication Data

US 2023/0078860 A1 Mar. 16, 2023

Related U.S. Application Data

(62) Division of application No. 16/446,688, filed on Jun. 20, 2019, now Pat. No. 11,492,272.

(60) Provisional application No. 62/688,499, filed on Jun. 22, 2018.

(51) Int. Cl.

| | |
|---|---|
| ***C02F 1/26*** | (2023.01) |
| ***B01D 17/02*** | (2006.01) |
| ***B01J 20/20*** | (2006.01) |
| ***B01J 20/26*** | (2006.01) |
| ***B01J 20/28*** | (2006.01) |
| ***B01J 20/30*** | (2006.01) |
| ***B01J 20/32*** | (2006.01) |
| ***C02F 1/28*** | (2023.01) |
| ***C02F 1/40*** | (2023.01) |
| ***C02F 1/48*** | (2023.01) |
| ***C02F 101/32*** | (2006.01) |

(52) U.S. Cl.

CPC .......... *C02F 1/288* (2013.01); *B01D 17/0202* (2013.01); *B01J 20/205* (2013.01); *B01J 20/262* (2013.01); *B01J 20/28009* (2013.01); *B01J 20/3078* (2013.01); *B01J 20/3204* (2013.01); *B01J 20/3272* (2013.01); *C02F 1/40* (2013.01); *C02F 1/48* (2013.01); *C02F 1/283* (2013.01); *C02F 1/285* (2013.01); *C02F 2101/32* (2013.01)

(58) Field of Classification Search

CPC .... C02F 1/28; C02F 1/288; C02F 1/40; C02F 1/48; C02F 1/283; C02F 1/285; C02F 2101/32; B01D 17/0202; B01J 20/205; B01J 20/262; B01J 20/28009; B01J 20/3078; B01J 20/3204; B01J 20/3272

USPC .............................................................. 502/1

See application file for complete search history.

(56) References Cited

U.S. PATENT DOCUMENTS

| | | | | |
|---|---|---|---|---|
| 11,492,272 | B2 * | 11/2022 | Biris | C02F 1/40 |
| 2014/0048478 | A1 * | 2/2014 | Bai | B01D 71/78 210/500.33 |

* cited by examiner

*Primary Examiner* — Daniel C. McCracken
*Assistant Examiner* — Starfari Teshawn McClain
(74) *Attorney, Agent, or Firm* — troutman pepper locke; Tim Tingkang Xia, Esq.

(57) ABSTRACT

A method of synthesizing a medium for fast, selective oil-water separation and/or oil absorption comprises providing a toluene solution containing a polymer or a polymer mixture; immersing porous wool-like structure (PW) in the toluene solution for a period of time; and removing the immersed PW from the toluene solution, and heat-treating the immersed PW to obtain the medium comprising polymer-modified PW, wherein the polymer or the polymer mixture is adapted such that the medium is a superwetting material that is superhydrophobic and superoleophilic under water or salty water.

10 Claims, 8 Drawing Sheets

FIG. 3A
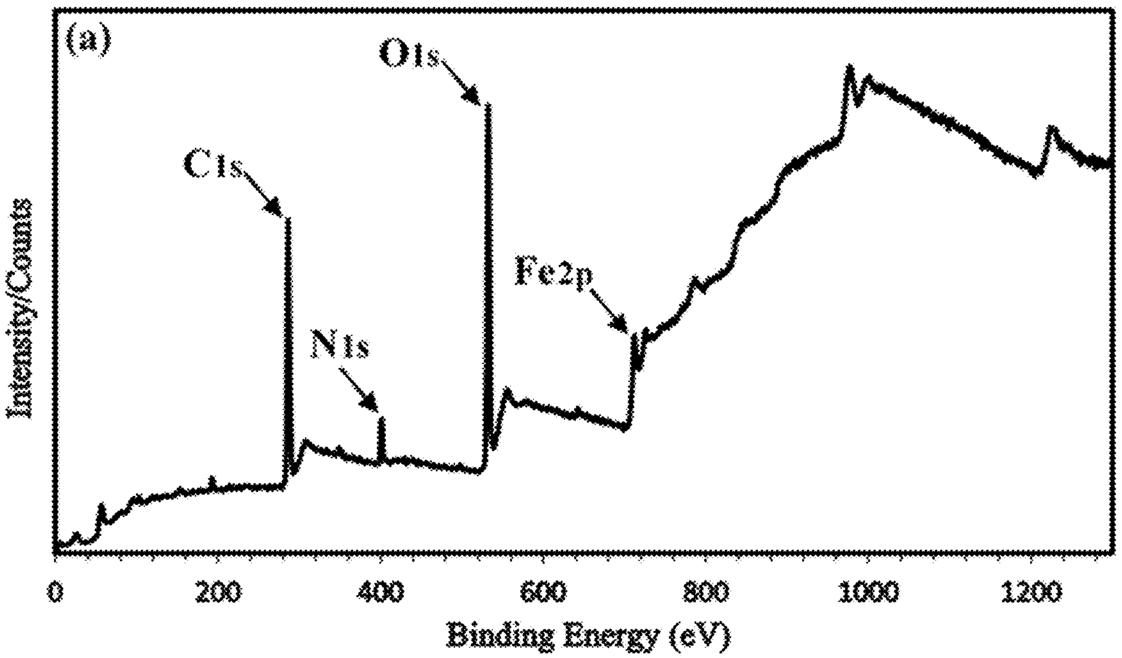
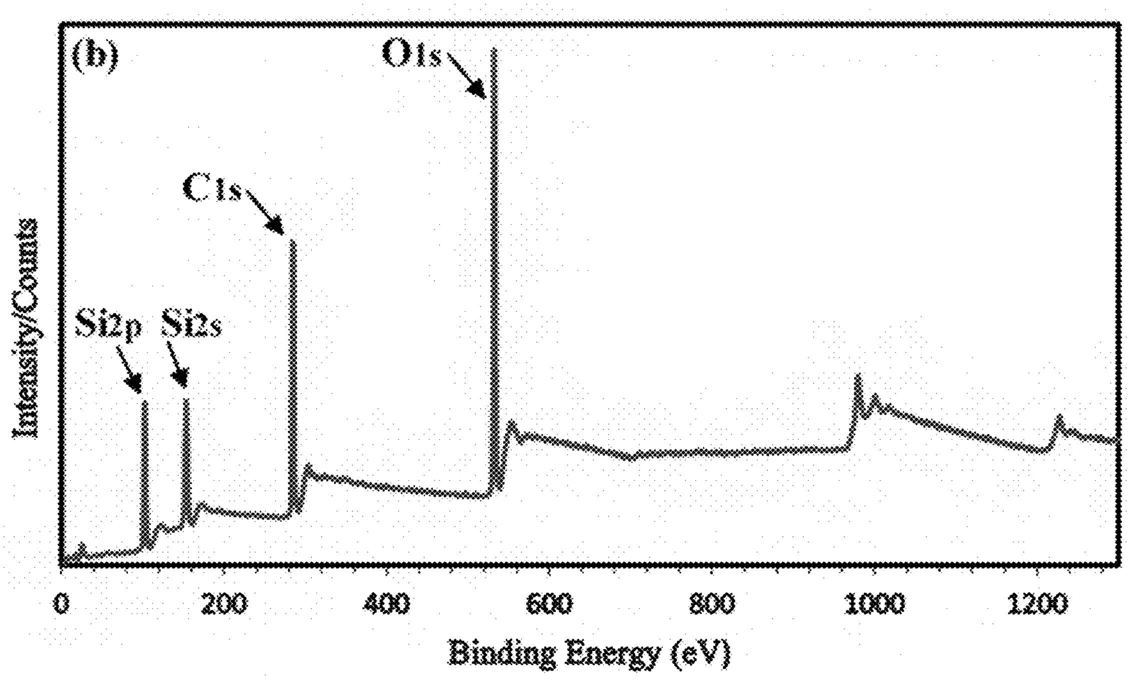
FIG. 3B

FIG. 6A
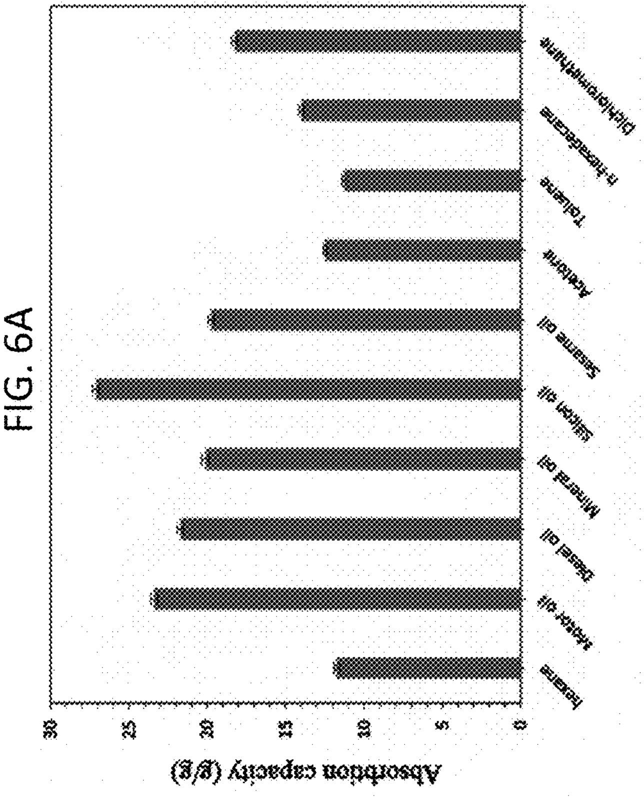
FIG. 6B
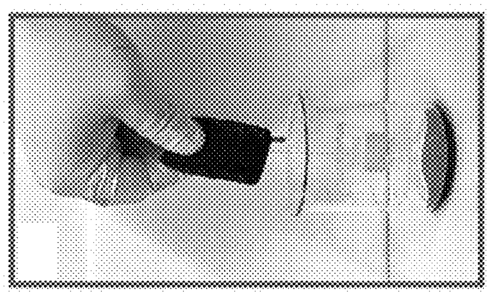
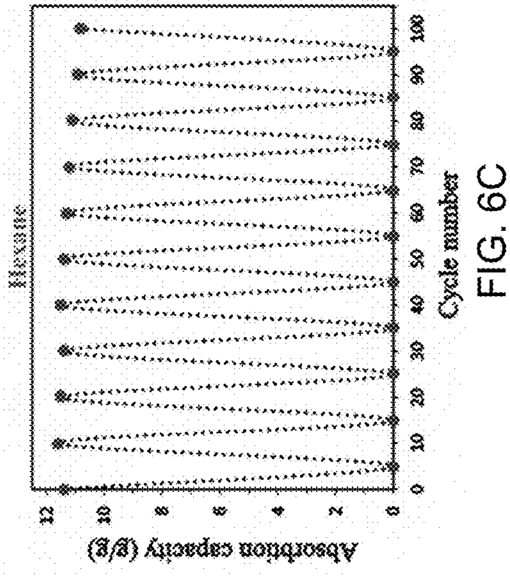
FIG. 6C
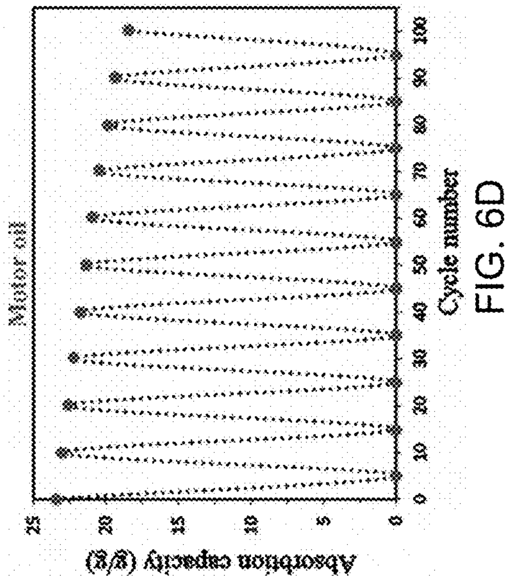
FIG. 6D

METHOD FOR SYNTHESIZING MAGNETIC, SUPERHYDROPHOBIC AND SUPEROLEOPHILIC MEDIUM

CROSS-REFERENCE TO RELATED PATENT APPLICATIONS

This application is a divisional application of, and claims benefit of U.S. patent application Ser. No. 16/446,688, filed Jun. 20, 2019, now allowed, claims priority to and the benefit of U.S. Provisional Patent Application Ser. No. 62/688,499, filed Jun. 22, 2018, which are incorporated herein in their entireties by reference.

STATEMENT AS TO RIGHTS UNDER FEDERALLY-SPONSORED RESEARCH

This invention was made with government support under Contract No. IIA-1457888 awarded by the National Science Foundation. The government has certain rights in the invention.

FIELD OF THE INVENTION

The invention relates generally to the field of materials, and more particularly, to a magnetic, superhydrophobic and superoleophilic medium for fast, selective oil-water separation and/or oil absorption, synthesizing methods and applications of the same.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

Technologies such as in situ burning, dispersing factors, solidifiers, enhanced bioremediation, skimmers, and booms have been utilized to clean up oil spills, but they have poor separation efficiency, low sorption capacity, poor recyclability, high operation cost, or may introduce secondary pollution during the clean-up process. Alternate solutions that use superwetting materials have been explored, mainly based on absorbent treatment and direct oil-water separation (filtration treatment). Superwetting materials are superhydrophobic, superoleophilic, and superoleophobic under water; they have shown significant promise for oil-water separation in a variety of forms, including carbonaceous hydrogels/aerogels, sponges, and films and manganese nanowires. However, the costly, toxic reagents/equipment and complex, lengthy fabrication methods and technologies required to create these materials limit their practical use.

Different inorganic mineral products, natural sorbent materials, artificial organic polymer absorbents, surface-treated polyurethane, inorganic or metallic-based meshes, and membranes have also been developed to separate oil and water. Unfortunately, most of these materials suffer from poor separation efficiency, lack of selectivity, low absorption capacity, inconvenience recycling, low stability, low flux, or degradation and polymer swelling, severely hampering their use. Thus, a solution for real oil spills and chemical leaks is still needed. Ideally, this solution would be a versatile material with low fabrication costs and stable performance in both fresh and salt water environments, able to be used as both a highly efficient absorbent (high capacity, selectivity, recyclability, and reusability) and a separator with high separation efficiency, permeate flux, and low power.

In the field of oil-water separations, "smart sorbents" are gaining popularity; these materials' absorption properties can be controlled by electrical, phonetic, thermal, PH, or magnetic input. Of these inputs, magnetic-controllable absorbents have recently received great interest, as they can be easily driven to the contaminated area simply by exploiting the magnetic field. Researchers have integrated and tested various water-repellent materials with magnetic materials. To date, three main strategies have been used to synthesize magnetic absorbents. The first method involves depositing a magnetic layer on the porous absorbent's surface. This method has two major potential disadvantages: 1) it can decrease the pore volume, which impacts absorption capacity, particularly if the magnetic particles are larger than microns, and 2) the magnetic coatings are not stable, meaning that, in order to recycle the absorbent, repeating the deposition and synthesis procedures will generally be needed. The second strategy involves polymerizing superhydrophobic absorbents with magnetic nanoparticles, but production costs are high and most of the products collapse or fracture under compression or stretching. The third method entails integrating polymeric materials with magnetic nanotubes, but it requires expensive nanomaterials and multiple, lengthy preparation steps, prohibiting large-scale fabrication. In other words, creating magnetic separators tends to be costly and complex, requiring magnetic nanoparticles/materials, and most have exhibited poor oil-water separation properties, such as low selectivity, poor recyclability/reusability, and low absorption capacity and stability.

Therefore, a heretofore unaddressed need exists in the art to address the aforementioned deficiencies and inadequacies.

SUMMARY OF THE INVENTION

One of the objectives of this invention is to provide a first simple, cost-effective magnetic, porous material that meets the urgent need.

In one aspect, the invention relates to a medium (porous material or article) for fast, selective oil-water separation and/or oil absorption. In one embodiment, the medium comprises a metallic or non-metallic porous wool-like structure (PW) with a tunable porosity that has its surface modified with a polymer or a mixture of polymers, where the polymer or polymer mixture is adapted such that the medium is a superwetting material that is superhydrophobic and superoleophilic under water or salty water. On certain embodiment, the PW comprises a wool-like metallic substrate, or one of a metallic porous medium, a magnetic porous medium and a non-metallic porous medium with tunable porosities.

In one embodiment, the polymer or polymer mixture comprises but not limited to polydimethylsiloxane (PDMS), polytetrafluoroethylene (PTFE), or polyvinylpyrrolidone (PVP) or other such polymers that have properties such as hydrophobic/superhydrophobic and oleophilic/superoleophilic. These polymers should have a surface energy that would allow water repulsion and oil absorption.

In one embodiment, the superwetting material is magnetically guidable.

In one embodiment, the superwetting material is recyclable and absorbate-retrievable, and chemical, mechanical, and environmental stable.

In another aspect, the invention relates to a method of synthesizing a medium for fast, selective oil-water separation and/or oil absorption. In one embodiment the method includes providing a toluene solution containing a polymer or polymer mixture; immersing a metallic or non-metallic PW including a wool-like metallic substrate or the porous structure (metallic or non-metallic-wool or porous media with tunable porosities; but also any porous metallic and magnetic media) in the toluene solution for a period of time; and removing the immersed PW from the toluene solution, and heat-treating the immersed PW to obtain the medium comprising polymer-modified PW, where the polymer is adapted such that the medium is a superwetting material that is superhydrophobic and superoleophilic under water or salty water (structurally porous media—SW).

In one embodiment, the polymer or polymer mixture comprises polydimethylsiloxane (PDMS), polytetrafluoroethylene (PTFE), or polyvinylpyrrolidone (PVP) or any polymer that has a surface energy that repels water but absorbs and interacts readily with oils.

In one embodiment, heat-treating the immersed PW comprises aging the immersed PW under an ambient condition for about 0.5-2 hours; and curing the aged PW at a temperature in a range of about 40-120 °C for about 12-36 hours.

In yet another aspect, the invention relates to a medium for fast, selective oil-water separation and/or oil absorption. In one embodiment, the medium includes a porous material coated with a carbon-based material or treated with a compound, such that the medium is a superwetting material that is superhydrophobic and superoleophilic under water.

In one embodiment, the compound comprises an organosilicon compound including hexamethyldisilane.

In one embodiment, the compound comprises of single or multiple polymers such as but not limited to PDMS, PTFE or PVP.

In one embodiment, the carbon-based material comprises graphene, carbon nanotubes, carbon films, carbon nanostructures of films or 3D porous carbon structures.

In one embodiment, the porous material comprises a bundle of thin and flexible porous metallic or non-metallic filaments or a media with controlled size porosities. In one embodiment, the porous material comprises PW.

In one embodiment, the superwetting material is magnetically guidable.

In one embodiment, the superwetting material is recyclable and absorbate-retrievable, and chemical, mechanical, and environmental stable.

In a further aspect, the invention relates to a method of synthesizing a medium for fast, selective oil-water separation and/or oil absorption. In one embodiment, the method includes providing a porous material; and coating the porous material with a carbon-based material, or treating the porous material with a compound, to obtain the medium, where the medium is a superwetting material that is superhydrophobic and superoleophilic under water or salty water.

In one embodiment, the treating step comprises immersing the porous material in a solution containing the compound; aging the immersed porous material under an ambient condition for about 0.1-5 hours; and curing the aged porous material at a temperature in a range of about 10-200 °C for about 1-50 hours.

In one embodiment, the coating step is performed by one of dipping, brushing, flow-coating, screen-printing, slot-die coating, gravure coating, powder coating, spraying and spin-coating.

In one embodiment, the compound comprises an organosilicon compound including hexamethyldisilane.

In one embodiment, the compound comprises of single of mixtures of materials such as but not limited to PDMS, PTFE, or PVP In one embodiment, the carbon-based material comprises graphene, carbon nanotubes, carbon films, carbon nanostructures of films or 3D porous carbon structures.

In one embodiment, the porous material comprises a bundle of thin and flexible metallic or non-metallic porous structures that could have filaments or tunable porosities. In one embodiment, the porous material comprises PW.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

FIGS. 3A-3B show X-ray photoelectron spectroscopy (XPS) spectra of the original PW and the modified PW, respectively, according to embodiments of the invention.

FIG. 6A shows absorption capacity of the modified PW for different oils and organic solvents, according to embodiments of the invention.

FIG. 6B shows a collection of motor oil from the modified PW by simple mechanical squeezing, according to embodiments of the invention.

FIGS. 6C-6D show the absorption capacity of the modified PW for hexane and motor oil, respectively, over 100 cycles, according to embodiments of the invention.

FIG. 8A, before separation; FIG. 8B, during separation; and FIG. 8C, after separation (the separation process was driven by gravity).

DETAILED DESCRIPTION OF THE INVENTION

Figure 1:
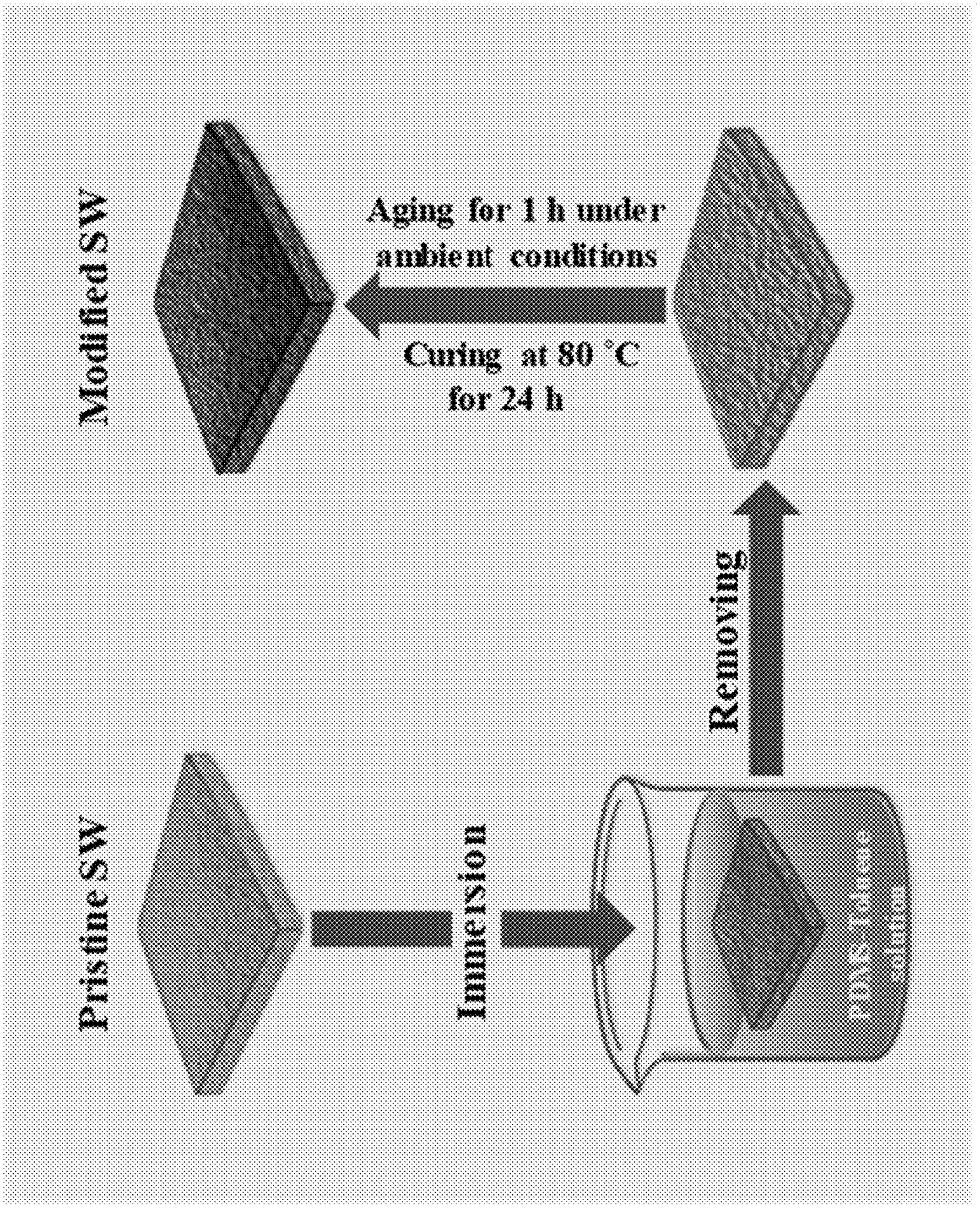
FIG. 1 shows a schematic diagram of a fabrication process used to create the polydimethylsiloxane (PDMS) modified porous wool-like structure (PW), according to embodiments of the invention.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that, as used in the description herein and throughout the claims that follow, the meaning of "a", "an", and "the" includes plural reference unless the context clearly dictates otherwise. Also, it will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

Efficient, affordable remediation of oil spills and chemical leaks is crucial in today's environment. This demands cost-effective, simple processes, easily reproducible for large-scale manufacturing, that produce functional, porous materials that separate and absorb oil from water, particularly in salt water.

In one aspect, this invention relates to a first simple, cost-effective magnetic, porous material (or medium/article) that meets the urgent need for fast, selective oil-water separation and/or oil absorption.

In certain embodiments, the material includes a porous wool-like structure (PW) modified with a polymer or a mixture of polymers, where the polymer or the mixture is adapted such that the medium is a superwetting material that is superhydrophobic and superoleophilic under water or salty water. The porous wool-like structure (PW) comprises a wool-like metallic substrate, or one of a metallic porous medium, a magnetic porous medium and a non-metallic porous medium with tunable porosities. In one embodiment, the PW is steel wool, also known as iron wool, wire wool, steel wire, wire sponge or steel mesh, is a bundle of very thin and flexible steel filaments. The media will allow oil to be absorbed but will repel water or salty water. The surface energy is such that will repel water and readily interact with oils. It can be formed in various shapes such as membranes, films, substrates, 3D complex structures and it can be connected to vacuum or suction devices. It can be held into a various position by a mechanical holder that fits the desired shape and size of the final filter. It can be used to remove oil from mixtures of oil/water-salty water.

In certain embodiments, the polymer comprises of single or mixtures of materials such as but not limited to polydimethylsiloxane (PDMS), polytetrafluoroethylene (PTFE), or polyvinylpyrrolidone (PVP), or other such polymers that have properties such as hydrophobic/superhydrophobic and oleophilic/superoleophilic. The surface energy should be such that it rejects water/salty water but interacts readily and/or absorbs oils.

According to the invention, the exemplary experiments demonstrated that the superwetting material of the PDMS-modified PW (also notated as PDMS-coated PW, or PDMS-PW) is superhydrophobic, superoleophilic, and capable of absorbing and separating oils and organic solvents from water. The material is highly mechanically and chemically stable, even in salty environments, and can be magnetically guided. It not only exhibited good selectivity, recyclability, and sorption capacity, but it was also able to absorb and remove large amounts of oils and organic solutions from stationary and turbulent water quickly and continuously. In addition, its inherent high porosity enables direct, gravity-driven oil-water separation with high permeate flux. The PDMS-PW's high flexibility and selective wettability also contributed to its efficient oil-water separation. Therefore, all findings indicate that the PDMS-modified PW has great practical potential for oil absorption and oil-water separation in real conditions.

According to the invention, for the first time, a superhydrophobic and superoleophilic PDMS-coated PW is fabricated and its efficient oil absorption and oil-water separation is demonstrated. The PW is a porous, affordable, inherently magnetic, commercially available material with high flexibility and mechanical stability that can be mass produced. Additionally, a PDMS coating is a silicone rubber that is also commercially available and has high flexibility and mechanical stability. Furthermore, PDMS can be irreversibly bound to steel fibers without adhesives and without altering its inherent magnetization.

The PDMS-PW absorbs various oils and organic solvents with high selectivity and sorption/separation capacities, outstanding recyclability, and excellent chemical, mechanical, and environmental stability. Due to its inherent magnetization, the modified steel wool can be guided by a magnet to selectively absorb oils floating on the water surface. In addition, the PDMS-PW can be utilized in conjunction with a vacuum apparatus to continuously absorb and remove oil pollutants from water in both calm and turbulent conditions, suggesting its usability for large-scale removal of oil pollutants in both pure and salty environments. In gravity-driven oil-water separation experiments, the material exhibited high separation efficiency and high flux, as well as effective oil separation in salty water.

In another aspect, the invention relates to a method of synthesizing a medium for fast, selective oil-water separation and/or oil absorption. The method includes providing a toluene solution containing a polymer; immersing PW in the toluene solution for a period of time; and removing the immersed PW from the toluene solution, and heat-treating the immersed PW to obtain the medium comprising polymer-modified PW, where the polymer is adapted such that the medium is a superwetting material that is superhydrophobic and superoleophilic under water. In one embodiment, the polymer comprises PDMS, PTFE, PVP or any polymer that has a surface energy that repels water but absorbs and interacts readily with oils.

In one embodiment, heat-treating the immersed PW comprises aging the immersed PW under an ambient condition for about 0.5-2 hours; and curing the aged PW at a temperature in a range of about 40-120 °C for about 12-36 hours.

The solution immersion method used requires only a single, simple step and affordable materials and does not requires multiple steps or complicated equipment, and as a result, is easy to scale up. The highly porous PDMS-PW is also magnetic without the addition of expensive nanoparticles, which were previously considered required to make a material magnetic for this application. The modified PW's magnetic properties allow it to be guided without contact to oil-polluted areas. Moreover, after collecting floating oil or organic pollutants and undergoing mechanical squeezing, the PDMS-PW can simply be driven back to the contaminated area to recover more spilled liquid. The modified PW not only shows high absorption performance, including high selectivity, high recyclability, and good capacity, but it can also continuously, quickly absorb and remove large amount of various oils/organic solvents from both calm and turbulent water. Furthermore, the PDMS-PW can separate oils from water with very high separation efficiency. In addition, the oil-water separation process is ultrafast and solely gravity-driven. Furthermore, the modified PW performs highly stable absorption, even in salty environments. The results of the experiments show that the PDMS-modified PW is a promising material for water remediation, cleaning up large-scale oil spillages, and oil recovery.

Alternatively, coating the material with carbon-based materials such as graphene, carbon nanotubes, carbon films, carbon nanostructures of films or 3D porous carbon structures or treated with chemicals such as hexamethyldisilane can be used as alternative materials.

In certain embodiments, the materials (medium or article) includes a porous material coated with a carbon-based material or treated with a compound, such that the medium is a superwetting material that is superhydrophobic and superoleophilic under water or salty water. The porous material can be modified such that it has a surface that can selectively remove water and absorb oil-based products and which works for regular as well as salty (ocean/seas equivalent) water-oil mixtures. In one embodiment, the porous material comprises a bundle of thin and flexible metallic or non-metallic porous structures that could have filaments or tunable porosities.

In one embodiment, the compound comprises an organosilicon compound including, but not limited to, hexamethyldisilane.

In one embodiment, the compound comprises PDMS, PTFE, PVP or any polymer that has a surface energy that repels water but absorbs and interacts readily with oils.

In one embodiment, the carbon-based material comprises graphene, carbon nanotubes, carbon coatings, crystalline or amorphous carbon films, or a combination thereof.

In one embodiment, the porous material comprises a bundle of thin and flexible metallic or non-metallic filaments. In one embodiment, the porous material comprises PW. In another embodiment, the porous material comprises a bundle of thin and flexible filaments or porous media that can be metallic or non-metallic. Metallic materials can be iron, cobalt, various metals and various metallic alloys with or without magnetic properties, steel, or other media that can be formed into filaments, fibers, porous structures with controllable porosities. The non-metallic media can be carbon fibrous materials, polymers, polymers mixed with magnetic and/or non-magnetic nanoparticles and particles or fibers, wood, glass fibers, oxides, membranes, etc.

In certain embodiments, the superwetting material is not only magnetically guidable, but also recyclable and absorbate-retrievable, and chemical, mechanical, and environmental stable.

Furthermore, the invention also relates to a method of synthesizing a medium for fast, selective oil-water separation and/or oil absorption. In one embodiment, the method includes providing a porous material, such as a metallic substrate that is a wool-like structure or porous structure (metallic or non-metallic-wool or porous media with tunable porosities; but also any porous metallic and magnetic media); and coating the porous material with a carbon-based material, or treating the porous material with a compound, to obtain the medium, where the medium is a superwetting material that is superhydrophobic and superoleophilic under water (structurally porous media—SW).

In one embodiment, the treating step comprises immersing the porous material in a solution containing the compound; aging the immersed porous material under an ambient condition for about 0.1-5 hours; and curing the aged porous material at a temperature in a range of about 10-200 °C for about 1-50 hours.

In one embodiment, the coating step is performed by one of dipping, brushing, flow-coating, screen-printing, slot-die coating, gravure coating, powder coating, spraying and spin-coating.

In one embodiment, the compound comprises an organosilicon compound including hexamethyldisilane.

In one embodiment, the compound comprises PDMS, PTFE, PVP, or any polymer that has a surface energy that repels water but absorbs and interacts readily with oils.

In one embodiment, the carbon-based material comprises graphene, carbon nanotubes, carbon coatings, crystalline or amorphous carbon films, or a combination thereof.

In one embodiment, the porous material comprises a bundle of thin and flexible steel filaments. In one embodiment, the porous material comprises PW.

These and other aspects of the present invention are further described below. Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

PDMS-Modified PW Medium

To create the oil-absorbent material, commercially available PW samples was dipped in a toluene solution containing PDMS, and then followed with a heat treatment. A schematic of this simple, fast fabrication process used to create the PDMS-modified PW is shown in FIG. 1; to the best of our knowledge, no one else has reported modifying commercial steel wool to enable its use for oil/water separation. The overarching rationale behind this preparation method and materials is as follows. First, it is easier and more practical to use a material that is commercially available than to find or create new materials. Second, the process is one step, simple, and cost effective and does not require extra (costly) nanoparticles, special chemicals, or complex treatments.

Figures 2A, 2B, 2C, 2D, 2E, 2F:
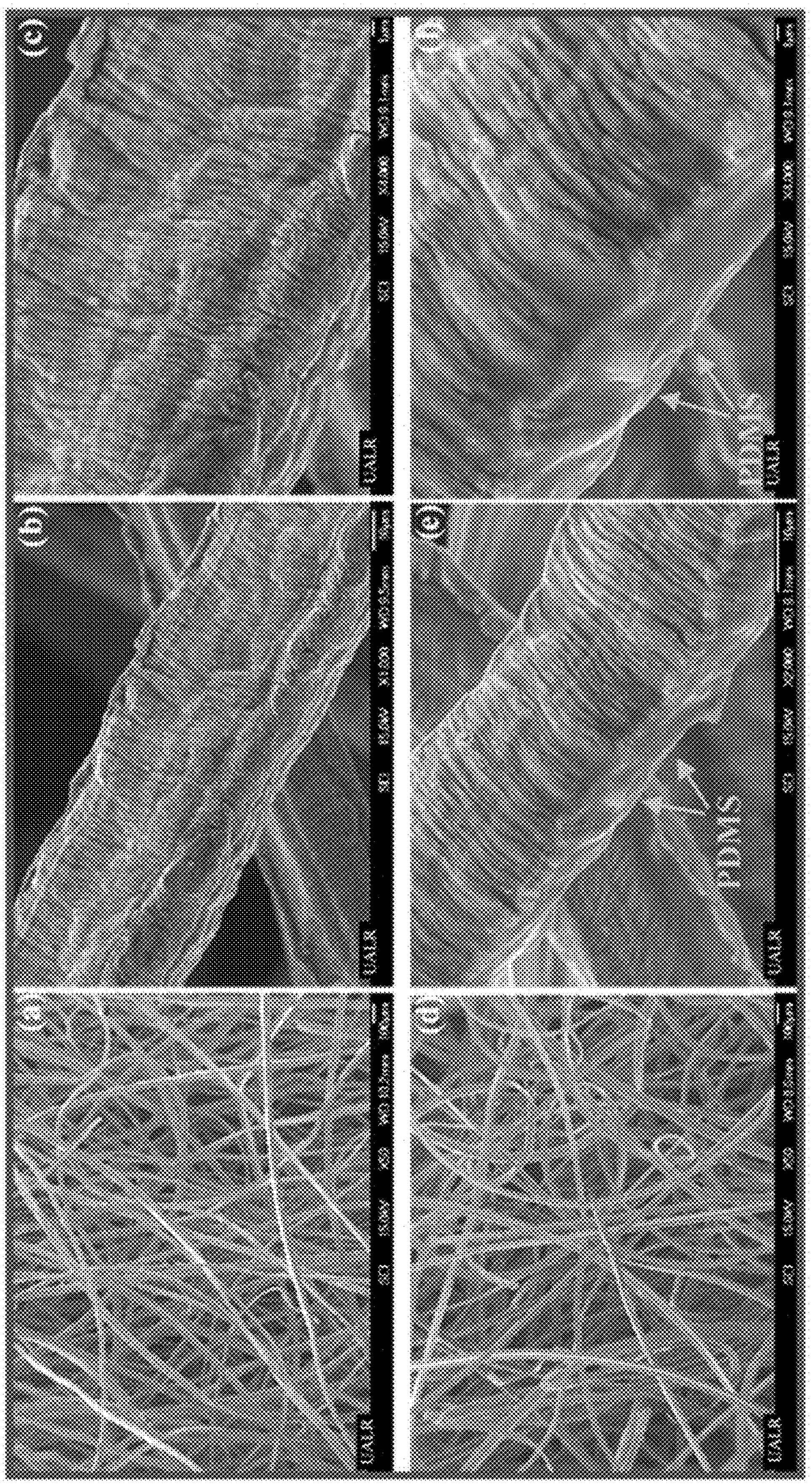
FIGS. 2A-2F show scanning electron microscope (SEM) images of the original PW, a single PW fiber, the single fiber at high magnification, the modified PW, PDMS-coated single fiber, and PDMS-coated single fiber at high magnification, respectively, according to embodiments of the invention.

Scanning electron microscopy (SEM) was used to study the microstructural morphology of the PW before and after PDMS modification. FIGS. 2A and 2D show that the porous structure of the PW is an open porous network with uniform steel microfibers about 25 μm in diameter, and the pores are different sizes in the hundreds of micrometers. Importantly, SEM analysis shows that the porous structure is nearly the same before and after PDMS coating, indicating that this modification does not damage the pristine structure of the PW or does not block its pores. The wool's open porous network helps it rapidly uptake and transport oils, chemical solvents, outer gases, and other liquids. SEM micrographs at higher magnifications reveals that a pristine single PW fiber has a rough surface including hierarchical structures, as shown in FIGS. 2B and 2C. SEM images also shows that the dip-coating process covered the fiber's rough surface with a thin waxy PDMS film, as shown in FIGS. 2E and 2F. These SEM images also indicates that the modified PW has both low surface energy and increased surface roughness. From these results, it is concluded that the wool's hierarchical structures, together with its micro-porous architecture, formed a composite interface in which air can be trapped beneath water within the surface's asperities, leading to superhydrophobicity (the Cassie-Baxter model).

To further confirm that the PW was successfully modified by PDMS, the surface chemistry of both pristine and modified PW are analyzed with x-ray photoelectron spectroscopy (XPS), as shown in FIG. 3A for the pristine PW and FIG. 3B for the modified PW. XPS identified the main element peaks to be C 1s, O 1s, Si 2p, and Si 2s with binding energies about 285, 532, 102, and 154 eV. New silicon peaks (Si 2p and Si 2s) appeared in the wide-scan spectrum for the modified PW, demonstrating that the Si-containing PDMS layer was incorporated successfully onto the PW's fibers. Moreover, in comparison with the pristine PW's wide-scan spectrum, the modified PW did not have an N 1s or Fe 1s peak, indicating that the PW was well coated with PDMS.

Figure 4A:
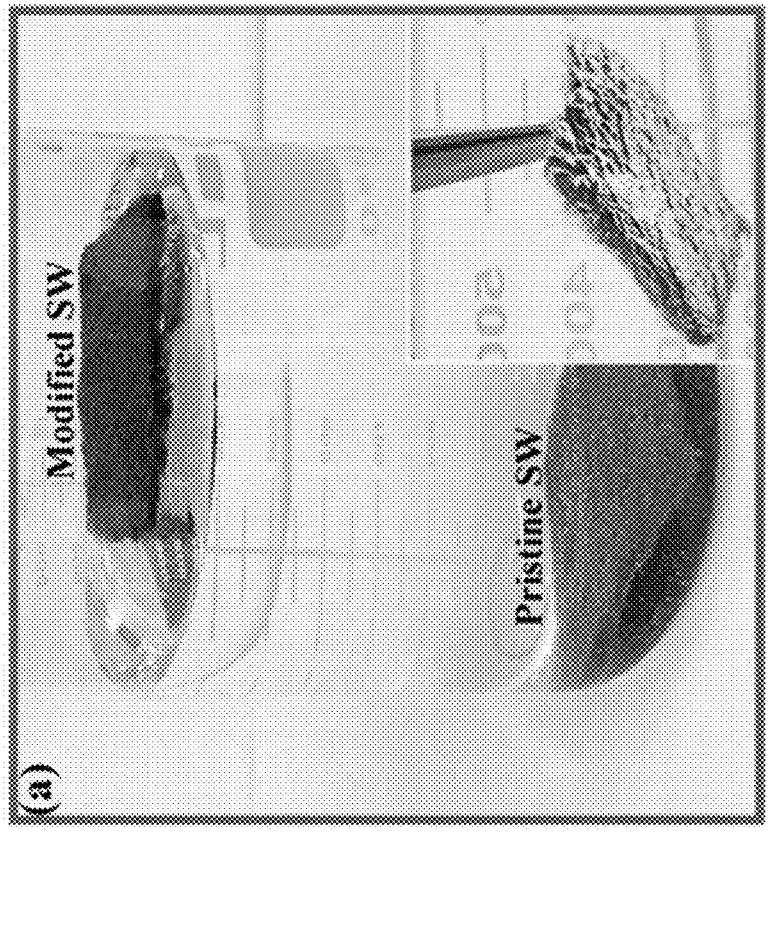
FIG. 4A shows a photograph of the original PW and modified PW after being placed into water. Inset: photograph of the modified PW after immersion in water by force, according to embodiments of the invention.
Figure 4B:
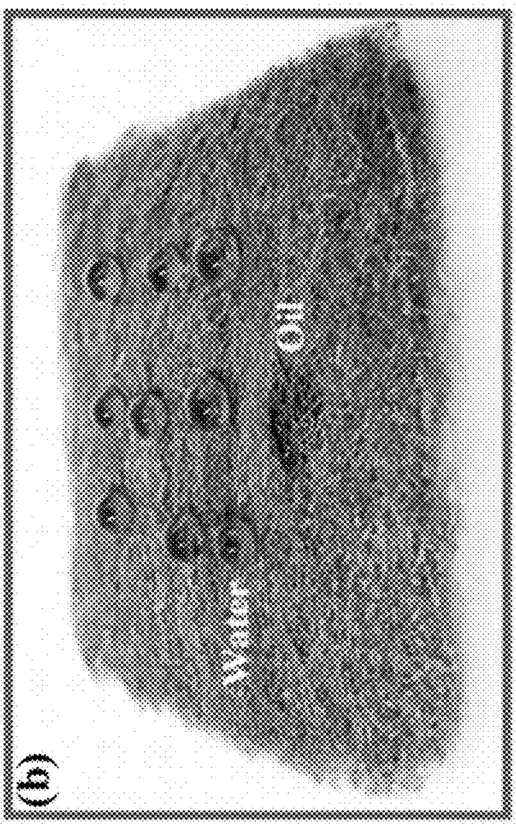
FIG. 4B shows a photograph of water droplets (blue) as semi-spheres and motor oil (red) on the surface of the modified PW, according to embodiments of the invention.

The pristine PW displayed typical superhydrophilic and superoleophilic properties. However, after being coated with PDMS, the modified PW floated on the water surface without taking in water, as shown in FIG. 4A; in contrast, the unmodified PW dropped to the bottom of the beaker. The inset of FIG. 4A shows that the surface of the PDMS-PW looked like a silver mirror when held underwater by external force, indicating that air was trapped between the water and solid interface and confirming that the PDMS-PW aligned with the non-wetting Cassie-Baxter model. The superhydrophobic behavior of the modified wool caused deposited water droplets to form a nearly spherical shape, as shown in FIG. 4B. In addition to its superhydrophobicity, the modified PW showed excellent superoleophilicity. When motor oil was dropped onto its surface, the oil was absorbed immediately (FIG. 4B), confirming the modified wool's superoleophilicity.

Selective Absorption

Figure 5A:
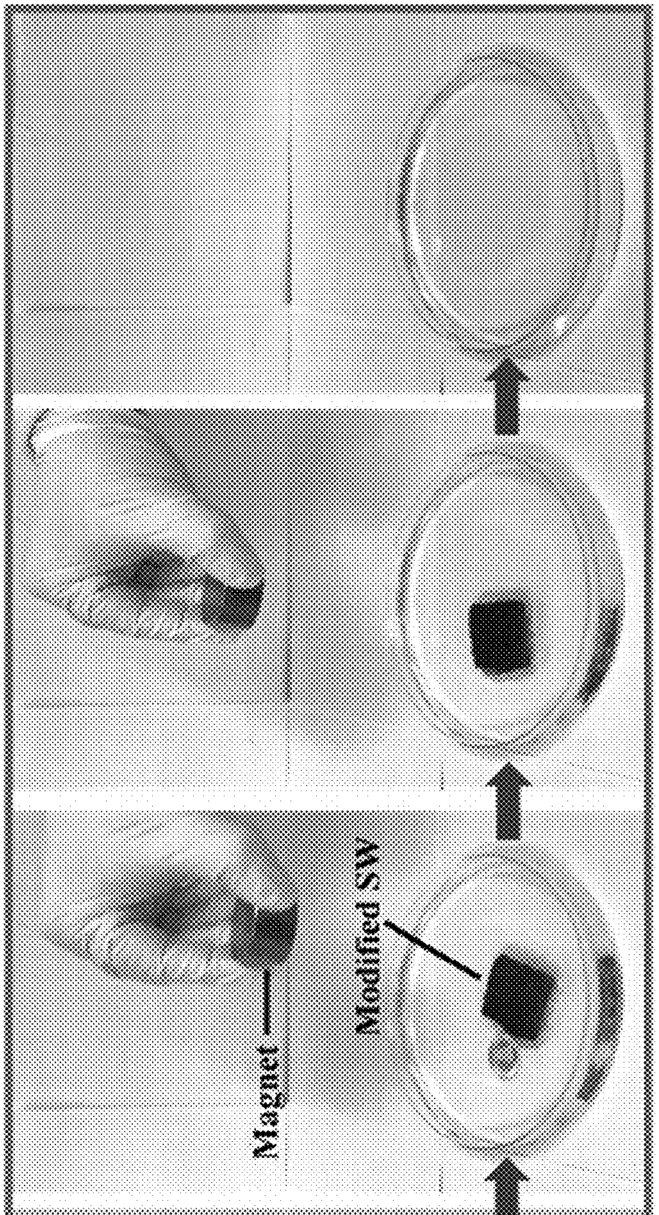
FIGS. 5A-5B show photographs of the modified PW being guided by a magnet to remove floating oil, and absorbing dichloromethane at the bottom of a beaker, respectively, according to embodiments of the invention.
Figure 5B:
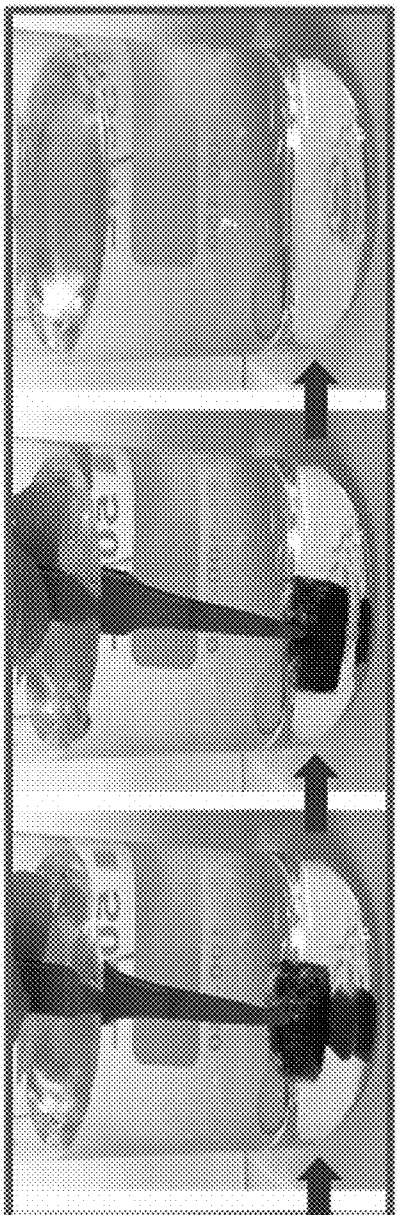

In certain embodiments, two types of tests to evaluate the modified PW's ability to selectively absorb oils/organic solvents in water were performed. The first test was performed on floating oil, as shown in FIG. 5A. An external magnet was used to control the PDMS-PW's direction on the surface of the oil-water mixture, guiding it to the contaminated area. The magnetically guided material quickly absorbed the floating oil (colored with Sudan red) in the contaminated area, leaving only water underneath. The wool was then taken out of the solution. From start to finish, the procedure took only a few seconds. In the second test, we investigated the wool's ability to selectively absorb oil under water, using dichloromethane (colored by Sudan red) as the oil, as it sinks in water due to its high density. When we immersed the modified wool in the dichloromethane-contaminated water by an external force, all the dichloromethane was rapidly—within a few seconds—sucked up into the wool upon contact, leaving a transparent, clean water region with no sign of colored oil when the wool was taken out of the water, as shown in FIG. 5B. These rapid absorption kinetics result from the modified wool's oleophilicity, capillaries, and high porosity.

The PDMS-PW shows high absorption capacities—up to 12-27 times its own weight—for common oils and organic solvents, depending on the organic liquid's density, viscosity, and surface tension, as shown in FIG. 6A. This absorption capacity is higher than that of several absorbents reported recently for similar organic liquids, including a PDMS sponge (5-11 g/g), aerogel composite (2-16 g/g), nitrogen-rich carbon aerogel (5-16 g/g), magnetic composite foam (13 g/g), magnetic silicone sponge (7-17 g/g), nanowire membrane (<20 g/g), and polypropylene sponges (5-20 g/g). Additionally, although the capacity of the modified PW is lower than that of other absorbents, such as new carbon sponges, films, and aerogels, these sorbents requires costly fabrication materials, special chemicals, and complicated, lengthy processes, limiting their mass production. In contrast, the preparation method for the PDMS-PW is one-step, simple, easily scaled up, and cost-effective, and no expensive raw materials, special chemicals or nanoparticles, or complex equipment are required. Therefore, from methodology to cost to versatility, our modified PW offers major advantages over current options for cleaning organic leaks and oil spills. FIG. 6B shows collection of motor oil from the modified PW by simple mechanical squeezing.

Recyclability and absorbate retrievability are key considerations when designing materials to remove oils and organic solvents, due to the need for environmental and economic sustainability. The modified PW satisfies both considerations, as demonstrated by mechanical squeezing tests. Hexane and motor oil were selected as the model absorbates for investigating the PDMS-PW's cyclic absorption/squeezing behavior. FIGS. 6C and 6D show the recyclability of the modified PW for hexane and motor oil, respectively, through 100 cycles.

The results demonstrate that, because of the PDMS-PW's elasticity, absorbates stored in its macrospores were able to be retrieved by mechanical squeezing. Additionally, the porous structure of the modified PW stayed the same after multiple cycles of absorption/squeezing. The simplest process for releasing an organic liquid, mechanical squeezing is faster and more eco-safe and cost-effective than other reported recycling processes, such as heat treatment and burning. For hexane, the modified PW showed high recyclability, even after 100 absorption/retrieval cycles, with the absorbance capacity largely remaining. However, for the viscous oil (motor oil), a slight reduction in oil absorbance capacity was observed over the 100 cycles. This deterioration is due to residual oil remaining inside the pores of the modified PW because it could not be totally removed after squeezing the wool through that many cycles.

Rinsing with strong organic solvents such as dichloromethane, trichloroethane, or dimethylformamide could be a good option for removing residual oil that cannot be recovered sufficiently by ethanol or acetone. For example, many materials, such as surface-treated polyurethane, organic fibrous sorbents, and silicone-treated textiles, have shown high absorption capacity, but their recyclability was not satisfactory because certain oils stayed in their pores and could not be adequately retrieved by alcohol or acetone due to low solubility in these solvents. In addition, rinsing with the powerful organic liquids listed above would dissolve these absorbents easily, rendering them useless. In contrast, the modified PW has high stability in these organic solvents, and after rinsing with dichloromethane and drying at 80 °C for several hours, the PDMS-PW showed roughly the same absorption capacity as fresh PDMS-PW. Together, these results affirm the high recyclability and reusability of the modified PW.

Continuous Oil Absorption

Figure 7A:
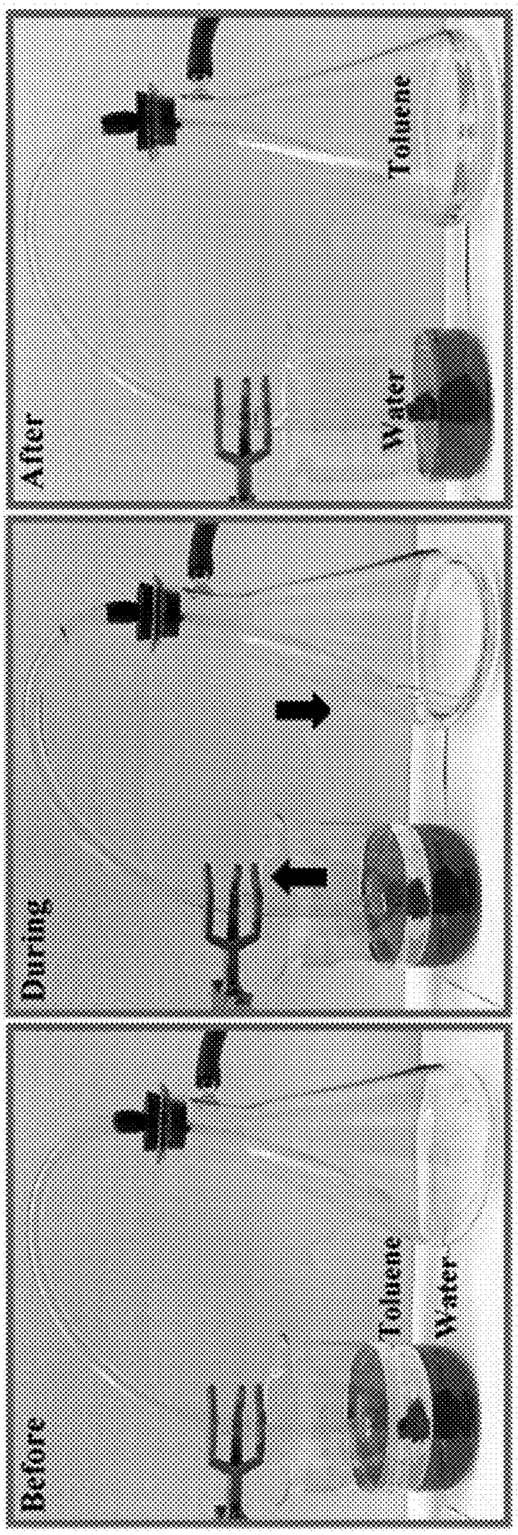
FIGS. 7A-7B show photographs showing the continuous absorption and removal of toluene from a nonturbulent oil-water mixture and an oil-water mixture made turbulent by a magnetic stirring plate, respectively, according to embodiments of the invention. The water was colored by methylene blue to enhance the visual impact.

In addition to being highly absorbent and recyclable, the ideal cleanup material would be able to continuously absorb and remove large amounts of oil and organic solvents from water. As illustrated in FIG. 7A, we investigated our modified wool's ability to perform such continuous absorption. A small piece of the modified wool was folded and crammed into the end of a narrow tube, then that end was fixed in a beaker containing oil (toluene) and water; the water was colored blue to distinguish it from the clear toluene. The tube's other end was connected to a vacuum pump by the filter flask. The modified wool absorbed the toluene quickly and repelled water completely. Additionally, the toluene was absorbed and removed simultaneously through the wool piece once the vacuum system was turned on. A toluene stream formed in the tube, and the oil was gradually sucked out of the water. Eventually, all the toluene was completely removed from the water's surface, leaving only blue water in the beaker. The retrieved toluene was collected into the filter flask, and no water droplets were seen in it.

This experiment was also carried out with other liquids in water: sesame oil, mineral oil, gasoline, and n-hexadecane. The modified PW completely separated the oils/organic solvent pollutants from the water surface, without absorbing any water. The PDMS-PW's separation efficiency for sesame oil, mineral oil, gasoline, and n-hexadecane were 99.5, 99.3, 99.7, and 99.6, respectively. Furthermore, at least 25 L of gasoline were able to be continuously collected by the modified wool with a separation efficiency of 99.7%, as well as high working stability. Therefore, the PDMS-PW has excellent selective oil-water separation efficiency.

Figure 7B:
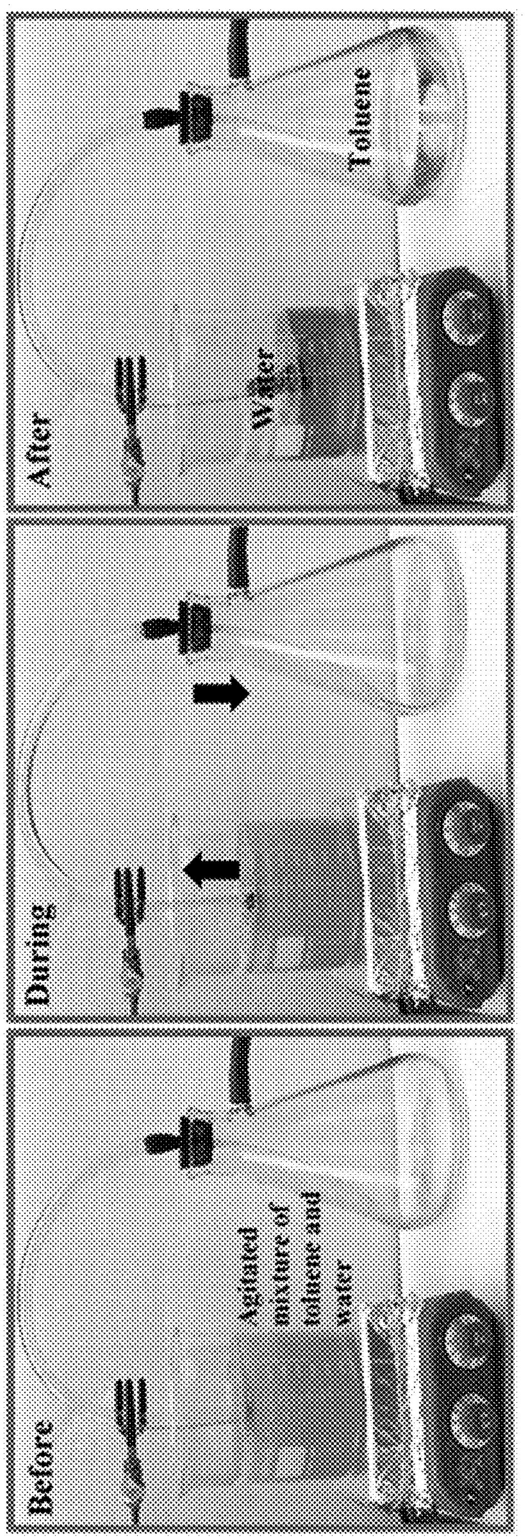

In real environments, such as the sea or a river, water is usually in motion rather than stationary, as it generally is in laboratory testing. Therefore, to mimic actual oil-polluted water conditions, we repeated the previous experiments under highly turbulent conditions. To create this turbulent effect, about 400 ml of toluene were added to a similar amount of water, and the mixture was strongly stirred via a magnetic bar to cause oil droplets to form in the water. We then began the vacuum-aided process described above. The oil droplets were continuously separated from water once the vacuum was turned on, while the water was not impacted at all, as shown in FIG. 7B.

While some continuous absorbents have been developed, very few can continuously remove oil from seawater selectively and in both static and dynamic conditions, even though these are common environments for oil spills. Therefore, an inexpensive, salt-tolerant superhydrophobic absorbent for efficient oil/seawater separation is urgently needed. To test the modified PW's potential to fill this need, the previous experiment were repeated, but with a complex oil (toluene)/saltwater mixture. To mimic seawater, 3.5 wt % NaCl was added to the water and mixed it well before turning on the vacuum. The PDMS-PW removed all of the transparent oil from the surface of the water, while leaving all the colored water in the beaker—no water droplets could be seen with the naked eye in the retrieved transparent oil. Furthermore, in around 7.25 seconds, the PDMS-PW removed the same amount of oil as a PDMS-graphene sponge did in 30 seconds.

In one embodiment, the modified wool's performance with the oil-seawater mixture was also tested under highly turbulent conditions. The PDMS-PW continuously removed around 400 ml of toluene from the water, and no blue water was visible in the collected oil in the filtrate flask. The water level in the beaker was stable despite the lengthy continuous pumping, indicating that the water was unaffected by the modified PW. In addition, the separation efficiency was maintained at 99.9%.

The continuous, quick absorption performed by our inexpensive, simply prepared modified PW in fresh or saltwater offers a major advantage over other current absorbents, which require expensive, complicated fabrication and can rarely perform in saltwater. The results of all our tests show that the novel PDMS-PW has strong practical potential for continuously absorbing and removing large amounts of oil and organic solutions from water in fresh and marine environments.

Oil-Water Separation

In addition to selective absorption, direct separation of oil from water is one of the main treatment techniques for addressing water pollution. Various materials have been used to fabricate superwetting surfaces, including metallic-based meshes, membranes, films, and filter papers. While these materials displayed high oil-water separation efficiency and selectivity, they also had a number of drawbacks, including complex fabrication, costly raw materials, and weak mechanical and chemical stability, limiting their large-scale production. Therefore, an efficient, scalable oil-water separator for oil spills that is cost effective and has low power consumption remains a serious need.

Figures 8A, 8B, 8C:
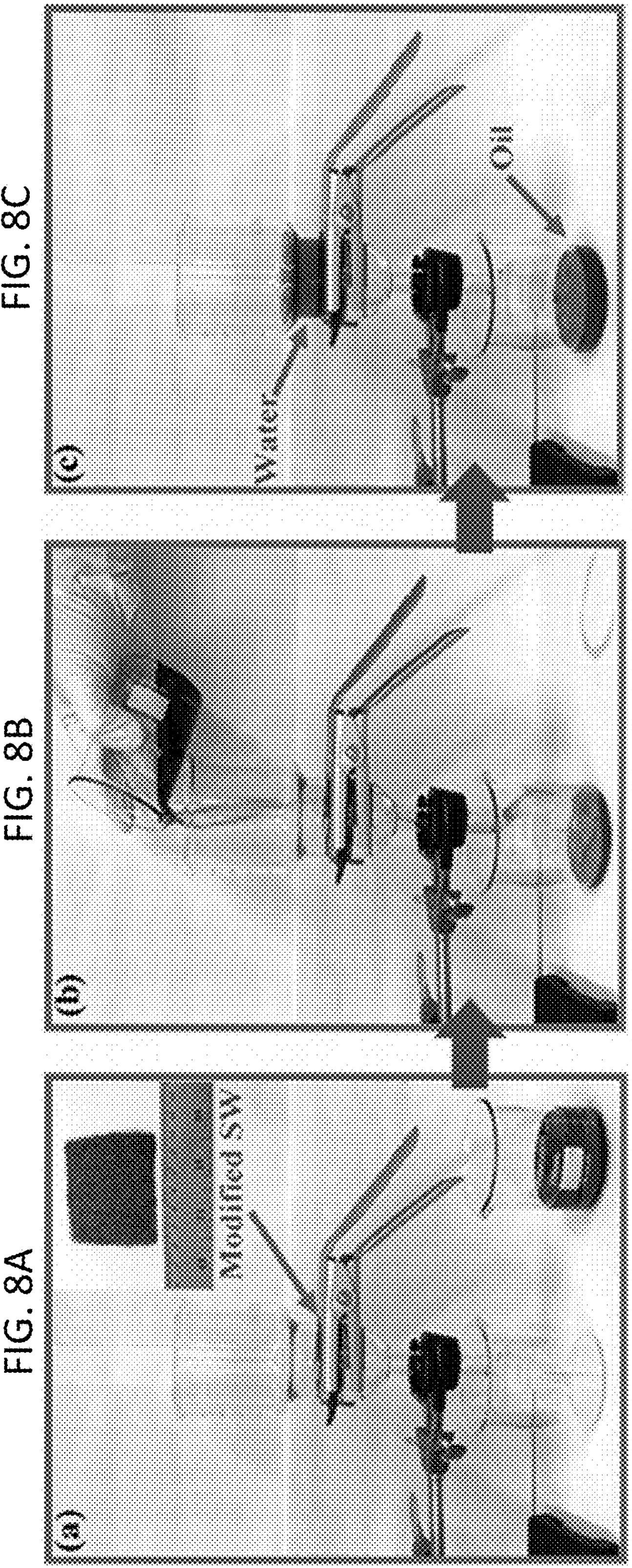
FIGS. 8A-8C show oil-water separation carried out by the modified PW (oil plus water dyed with Sudan red or methylene blue, respectively), according to embodiments of the invention.

Given its superhydrophobic and superoleophilic nature and high flexibility, the modified PW according to the invention fills this need. To test this potential, a practical oil/water separation experiment was conducted, as shown in FIG. 8A. First, a small piece of wool was cut (60×60×7 mm), placed on stainless-steel mesh, and fixed between two glass beakers. A mixture of cyclohexane (colored with Sudan red) and water (colored with methylene blue) was prepared and poured onto the PDMS-PW. The cyclohexane was able to rapidly penetrate the separator and pass to the bottom of the beaker underneath it, driven solely by gravity, as shown in FIG. 8B. In contrast, the water was repelled by the modified PW and stayed in the upper beaker, as shown in FIG. 8C. The entire oil/water separation procedure was performed within a few seconds with no additional force, demonstrating the easiness and low energy consumption of the process. Therefore, the superhydrophobic PDMS-PW clearly allowed oils to rapidly pass through it but prevented water from doing so, thus separating the two.

Figure 8D:
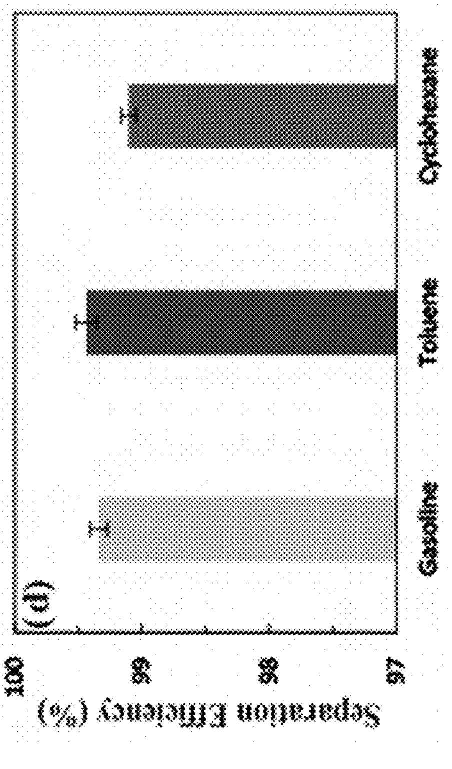
FIG. 8D shows separation efficiency of the modified PW for various oil-water mixtures, according to embodiments of the invention.

Furthermore, mixtures of toluene or gasoline with water were effectively separated by the modified PW, with separation efficiency values reaching over 99%, as shown in FIG. 8D. Due to its robust coating adhesion, the modified PW retained its superhydrophobicity after 40 separations, as demonstrated by XPS analysis and a water droplet bouncing off the surface. Additionally, these oil/water separation experiments were repeated with saltwater (3.5% salt). In a cyclohexane/saltwater mixture, the modified PW successfully separated the cyclohexane from the saltwater, with the separation efficiency staying above 99%.

Figure 8E:
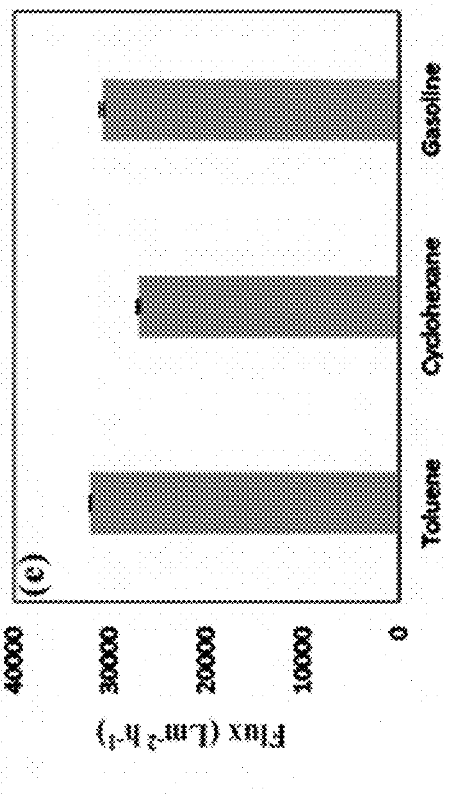
FIG. 8E shows flux for permeating different types of oils through the modified PW, according to embodiments of the invention.

Permeate flux is an important factor for evaluating oil-water separation, as higher permeate flux results in faster separation. The modified PW displayed ultrafast separation of oil from water mixture via gravity alone. Different oil fluxes that permeated through the PDMS-PW were evaluated and averaged after repeating 3 times; a 7-mm-thick sample was used. The average flux values for the permeating oils—toluene, gasoline, and cyclohexane—were 32026.4±141.2, 30793.6±432.7, and 27029.1±315.2 $L/m^2 \cdot h$, respectively, as shown in FIG. 8E. These flux values are much higher than those of many advanced separators reported in the literature, including PFOTS-modified $SiO_2$/carbon stainless steel mesh (<1000), carbon-silica nanofibrous membrane (1500-3000 $L/m^2 \cdot h$), superhydrophobic and superoleophilic polyvinylidene fluoride membrane (700-3500 $L/m^2 \cdot h$), and a polyethylene mesh (<7500 $L/m^2 \cdot h$). The superoleophilic nature and open-pore network of the modified PW allowed for its rapid mass transport.

Briefly, the PDMS-PW's high separation efficiency, ultrafast permeate flux (25000-33000 $L/m^2 \cdot h$), reusability, low-cost raw materials, simple preparation, scalability, and usability in salty environments make it a promising candidate for real-world oil-water separation.

Advantages

For the first time, a superhydrophobic and superoleophilic PDMS-coated PW is fabricated and its efficient oil absorption and oil-water separation demonstrated according to the invention. The solution immersion method used requires only a single, simple step and affordable materials and, as a result, is easy to scale up. The highly porous PDMS-PW is also magnetic without the addition of expensive nanoparticles. The modified PW's magnetic properties allow it to be guided without contact to oil-polluted areas. Moreover, after collecting floating oil or organic pollutants and undergoing mechanical squeezing, the PDMS-PW can simply be driven back to the contaminated area to recover more spilled liquid. The modified PW not only shows high absorption performance, including high selectivity, high recyclability, and good capacity, but it can also continuously, quickly absorb and remove large amount of various oils/organic solvents from both calm and turbulent water. Furthermore, the PDMS-PW can separate oils from water with very high separation efficiency. In addition, the oil-water separation process is ultrafast and solely gravity-driven. Moreover, the modified PW performs highly stable absorption, even in salty environments. Accordingly, the PDMS-modified PW is a promising material for water remediation, cleaning up largescale oil spillages, and oil recovery. The technology is capable to selectively remove oil bi-products either in a static as well as a mixture (dynamic) modality The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

What is claimed is:

1. A method of synthesizing a medium for fast, selective oil-water separation and/or oil absorption, comprising:
- providing a toluene solution containing a polymer or a polymer mixture;
- immersing porous wool structure (PW) in the toluene solution for a period of time; and
- removing the immersed PW from the toluene solution, and heat-treating the immersed PW to obtain the medium comprising polymer-modified PW,
- wherein the polymer or the polymer mixture is adapted such that the medium is a superwetting material that is superhydrophobic and superoleophilic under water or salty water,
- wherein heat-treating the immersed PW comprises:
  - aging the immersed PW under an ambient condition for about 0.5-2 hours; and
  - curing the aged PW at a temperature in a range of about 40-120 °C for about 12-36 hours.

2. The method of claim 1, wherein the porous wool structure (PW) comprises a wool metallic substrate, or one of a metallic porous medium, a magnetic porous medium and a non-metallic porous medium with tunable porosities.

3. The method of claim 1, wherein the polymer or the polymer mixture comprises polydimethylsiloxane (PDMS), polytetrafluoroethylene (PTFE), polyvinylpyrrolidone (PVP), or a combination thereof.

4. A method of synthesizing a medium for fast, selective oil-water separation and/or oil absorption, comprising:
- providing a porous material; and
- coating the porous material with a carbon-based material, or treating the porous material with a compound, to obtain the medium,
- wherein the medium is a superwetting material that is superhydrophobic and superoleophilic under water or salty water,
- wherein the treating step comprises:
  - immersing the porous material in a solution containing the compound;
  - aging the immersed porous material under an ambient condition for about 0.1-5 hours; and
  - curing the aged porous material at a temperature in a range of about 10-200 °C for about 1-50 hours.

5. The method of claim 4, wherein the coating step is performed by one of dipping, brushing, flow-coating, screen-printing, slot-die coating, gravure coating, powder coating, spraying, pulsed laser deposition, and spin-coating or similar.

6. The method of claim 4, wherein the compound comprises an organosilicon compound including hexamethyldisilane.

7. The method of claim 4, wherein the compound comprises polydimethylsiloxane (PDMS), polytetrafluoroethylene (PTFE), polyvinylpyrrolidone (PVP), or a combination thereof.

8. The method of claim 4, wherein the carbon-based material comprises graphene, carbon nanotubes, carbon coatings, crystalline or amorphous carbon films, or a combination thereof.

9. The method of claim 4, wherein the porous material comprises porous wool structure (PW) or a structurally porous material.

10. The method of claim 9, wherein the porous material comprises a bundle of thin and flexible filaments or media with tunable porosities.

* * * * *